United States Patent
Hatazawa

(10) Patent No.: US 7,865,302 B2
(45) Date of Patent: Jan. 4, 2011

(54) METHOD AND APPARATUS FOR DISPLAYING HOUSE NUMBER AND BUILDING FOOTPRINT IN ARRIVAL SCREEN FOR NAVIGATION SYSTEM

(75) Inventor: Mari Hatazawa, Torrance, CA (US)

(73) Assignee: Alpine Electronics, Inc., Tokyo (JP)

( * ) Notice: Subject to any disclaimer, the term of this patent is extended or adjusted under 35 U.S.C. 154(b) by 918 days.

(21) Appl. No.: 11/729,550

(22) Filed: Mar. 29, 2007

(65) Prior Publication Data

US 2008/0243374 A1    Oct. 2, 2008

(51) Int. Cl.
*G08G 21/30* (2006.01)

(52) U.S. Cl. ...................................... 701/208

(58) Field of Classification Search ......... 701/200–202, 701/208, 211, 213–215; 340/988, 995.1, 340/995.19; 342/357.06, 357.09
See application file for complete search history.

(56) References Cited

U.S. PATENT DOCUMENTS 5,107,433 A * 4/1992 Helldorfer et al. .......... 701/202
5,177,685 A * 1/1993 Davis et al. ............... 455/456.5
5,884,218 A * 3/1999 Nimura et al. ............... 701/208
7,164,988 B2 * 1/2007 Kato .......................... 701/209
7,280,913 B2 * 10/2007 Ruschkowski ............... 701/200
7,383,125 B2 * 6/2008 de Silva et al. .............. 701/209
7,590,487 B2 * 9/2009 De Silva ..................... 701/209

FOREIGN PATENT DOCUMENTS

JP          08-14930         1/1996

* cited by examiner

*Primary Examiner*—Yonel Beaulieu
(74) *Attorney, Agent, or Firm*—Muramatsu & Associates

(57) ABSTRACT

A method for displaying an arrival screen for a navigation system includes the steps of receiving a house number of a destination specified by a user, retrieving map data indicating a road segment which includes the specified house number thereon, estimating positions of the destination based on the house number of the destination and position data of the road segment, and displaying a destination arrival screen when the user comes within a predetermined distance range from the destination. The destination arrival screen displays a street number over a building footprint where the user is passing by, a position of the destination, a current position of the user, and a road on which the user is moving.

20 Claims, 13 Drawing Sheets

Fig. 1A
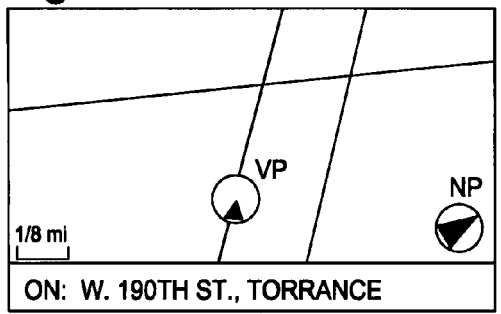
Fig. 1B
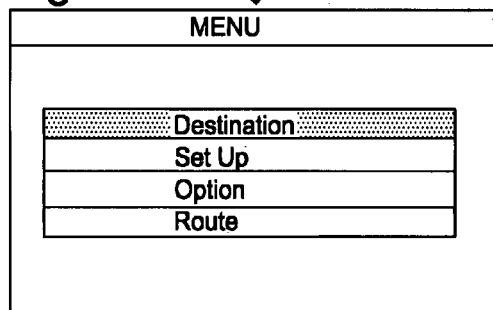
Fig. 1C
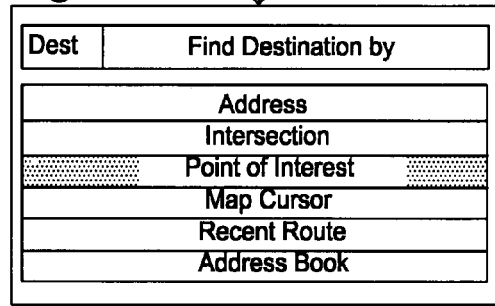
Fig. 1D
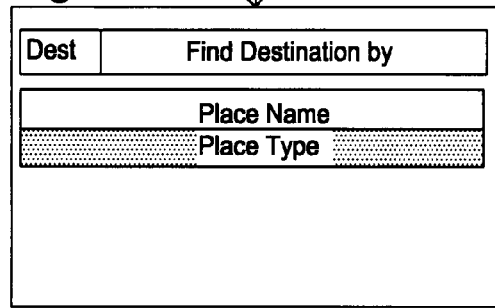
Fig. 1E
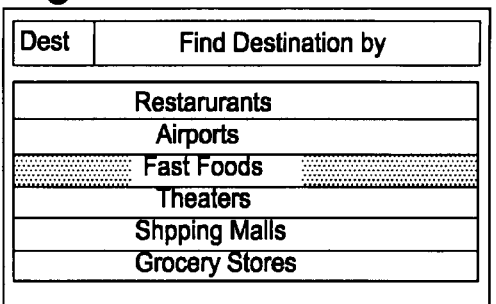
Fig. 1F
| Fast Foods | Hit 397 |
|---|---|
| Burger King | 1.23mi |
| Carl's Jr. | 1.45mi |
| Kentucky Fried Chiken | 1.69mi |
| Pizza Hut | 2.21mi |
| Del Taco | 2.67mi |
Fig. 1G
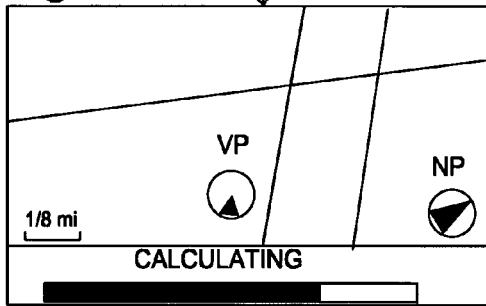
Fig. 1H
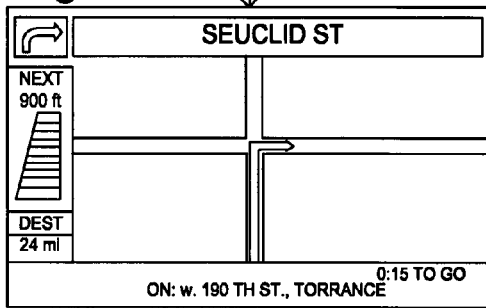

METHOD AND APPARATUS FOR DISPLAYING HOUSE NUMBER AND BUILDING FOOTPRINT IN ARRIVAL SCREEN FOR NAVIGATION SYSTEM

FIELD OF THE INVENTION

This invention relates generally to a method and apparatus for displaying an image for a navigation system, and more particularly, to a method and apparatus for displaying a destination arrival screen including a house number for a navigation system that allows a user to easily identify the exact distance from a vehicle position to a destination, thereby more accurately detecting the arrival at the destination.

BACKGROUND OF THE INVENTION

A navigation system performs travel guidance for enabling a user to easily and quickly reach the selected destination. A typical example is a vehicle navigation system where a vehicle is equipped with a navigation function to guide a driver to a destination through a calculated route. Such a navigation system detects the position of the user's vehicle, and reads out map data pertaining to an area at the current vehicle position from a data storage medium. Typically, the navigation system displays a map image on a monitor screen while superimposing thereon a mark representing the current vehicle position. At an intersection associated with the calculated route, the navigation system notifies the user which direction to turn at the intersection to reach the destination.

FIGS. 1A-1H show an example of overall procedure and screen displays involved in the operation of the navigation system. FIG. 1A shows an example of locator map screen of the navigation system when the destination is not specified. Typically, the navigation system displays a street on which the vehicle (vehicle position VP) is running on a map image and a name of the street. Other information such as a north pointer NP, a map scale and a current time may also be illustrated on the display screen.

An example of process for specifying a destination in the navigation system through a Point of Interest (POI) search method is shown in FIGS. 1B-1F. A main menu screen such as shown in FIG. 1B displays menu items including a "Destination" menu for entering the destination. When selecting "Destination", the navigation system displays a "Find Destination by" screen as shown in FIG. 1C for specifying an input method for selecting the destination. The "Find Destination By" screen lists various methods for selecting the destination including "Address" for specifying the city and address of the destination, "Intersection" for specifying the names of two streets which intersect with one another, and "Point of Interest (POI)" for selecting the programmed destination based on the name, category or telephone number.

When selecting, the "Point of Interest" method in FIG. 1C, the navigation system displays selection methods of point of interest (POI) either by "Place Name" or "Place Type" in FIG. 1D. The "Place Name" is to specify a name of POI, and the "Place Type" is to specify a category of POI. If the "Place Type" is selected in FIG. 1D, the navigation system lists categories of POIs as shown in FIG. 1E. The user selects a desired category of destination from the lists.

FIG. 1F shows a screen when the user has selected a "Fast Foods" category in the example of FIG. 1E. In this example, the screen includes the name of POI type "Fast Foods" at the top and a list of names of the fast food restaurants typically sorted by distance from the current position. The user selects a particular restaurant among the restaurant lists for route guidance. In FIG. 1G, the navigation system determines an appropriate route to the destination. After determining the calculated route, the navigation system starts the route guidance as shown in FIG. 1H.

Typically, the navigation system will show an arrival screen such as shown in FIGS. 2A and 2B when the vehicle approaches the destination. The current vehicle position indicator 71 and the destination icon 91 are shown on the map image. The screens shown in FIGS. 2A and 2B are similar to those ordinarily displayed while the navigation system guides the user to the destination, except that the screens show the destination icon 91 that indicates the location of the destination on the map image.

FIG. 2A shows the situation where the user is close to the destination but has not yet fully reached the destination while FIG. 2B shows the situation where the vehicle has reached the destination. In FIG. 2B, the navigation system announces that the vehicle has arrived at the destination when the vehicle is within an arrival detection range such as 300 feet. However, since the destination icon 91 on the map image does not show the accurate location, when there are many houses or buildings within the arrival detection range, the user has a difficulty in estimating the distance to the destination if it is a new place for the user.

Thus, there is a need for a navigation system to allow the user to more easily and accurately estimate the distance from the current use's position to the destination. Japanese Patent Application Laid-Open No. H8-14930 discloses a navigation system including address map database, road map information and a means for detecting current position to synthesize and display them on a screen. According to the navigation system, since many addresses together with town names and the current position are displayed on the road map on a screen, still it is difficult to estimate the distance to the destination when comparing the information obtained from the navigation system with an actual outside view. Further, this prior art discloses an auxiliary display in a route guidance unit for a car in which road guidance information can be confirmed by a left and right turn LEDs, a straight advance indicator LED, a seven-segment LED indicating the number of intersections encountered before turning left or right and LED indicating approach or arrival at a destination. However, since the information obtained from the guidance indicator is to give the user a direction to the destination, it is difficult to estimate the distance from the current position to the destination.

SUMMARY OF THE INVENTION

It is, therefore, an object of the present invention to provide a method and apparatus for displaying a destination arrival screen for a navigation system, which allows a user to easily estimate the distance from a current vehicle position to the destination.

It is another object of the present invention to provide a method and apparatus for displaying a destination arrival screen for a navigation system which is able to more accurately and easily display the location of the destination and the current user's location.

It is a further object of the present invention to provide a method and apparatus for displaying a destination arrival screen for a navigation system which is able to more accurately detecting an arrival at the destination.

One aspect of the present invention is a method for displaying an arrival screen showing a street address number on a top of building footprint to indicate where the vehicle is passing by. The method includes the steps of: receiving a street address number of a destination specified by a user, retrieving data indicating a road segment which includes the specified street address number thereon from a map information storage, estimating positions of the destination based on street numbers of the destination and position data of the road segment, detecting whether the user comes within a predetermined distance range from the destination, and displaying a destination arrival screen when the user comes within the predetermined distance range from the destination.

In the method of the present invention, the destination arrival screen displays a street number over a building footprint where the user is passing by, a position of the destination, a current position of the user, a road on which the user is moving, and street address numbers of the destination address. The street number changes in response to the changes of the current position of the user.

The destination arrival screen further includes a count down number for counting a number of buildings located between the current position and the position of the destination and a position mark showing the position of the destination. Every time when the user passes a house, the navigation system shows a number of remaining houses until the destination.

Another aspect of the present invention is an apparatus for displaying a destination arrival screen for a navigation system for implementing the various steps of the method noted above. The navigation system is designed to display a street address number on a top of the building footprint where the user is passing by, a position of the destination, a current position of the user, a road on which the user is moving, and street address numbers of the destination address.

According to the present invention, the navigation system allows the user to more easily estimate the distance to the destination by displaying the street address number on the top of the building footprint where the user is passing by, a position of the destination, a current position of the user, a road on which the user is moving, and street address numbers of the destination address. Since the street address of the building footprint where the user is passing by can be directly compared with the street address of the destination, the user is able to more easily estimate the distance from the current position to the destination when the user enters into the area that is less than a predetermined distance from the destination.

Further, the destination arrival screen further includes a count down number for counting a number of buildings located between the current position and the position of the destination and a position mark showing the position of the destination. By counting down the simple number on the screen as well as by voice announcement, the user can easily arrive at the destination with high accuracy.

BRIEF DESCRIPTION OF THE DRAWINGS

FIGS. 1A-1H are schematic diagrams showing an example of operational process and screen displays involved in the navigation system for selecting a destination and conducting a route guidance operation to the destination.

FIG. 2A shows the situation where the vehicle is close but not fully arrived at the destination and FIG. 2B shows the situation where the vehicle has reached the destination.

FIGS. 3A and 3B show a relationship between an ordinary route guidance screen and a destination arrival screen, FIG. 3C shows the situation where the vehicle is close to the destination, FIG. 3D shows the situation where the vehicle has advanced further close to the destination, FIG. 3E shows the situation where the vehicle has fully arrived at the destination, FIG. 3F shows an example of the destination arrival screen when building footprint data is unavailable, FIG. 3G shows the situation where house number indicator and the building footprints are on the right side of the screen, FIG. 3H shows the situation where house number indicator and the building footprints are on both sides of the screen.

DETAILED DESCRIPTION OF THE PREFERRED EMBODIMENT

The present invention will be described in detail with reference to the accompanying drawings. In the present invention, the method and apparatus for a navigation system displays a destination arrival screen in which a street address number (house number) is dynamically displayed and changed in response to a vehicle position. When the vehicle approaches within a predetermined distance from the destination, the navigation system displays the destination arrival screen with street numbers over building footprints. The destination arrival screen includes a mark of the destination (destination indicator), its street address number as well as neighboring street address numbers (house number indicator) and position marks such that the user can readily correlate the present location and the locations on the arrival screen.

Although the description is made for the case that the destination arrival screen of the present invention is implemented to a vehicle, it should be noted that the present invention can be implemented to other devices or transportation machine. For instance, the present invention may be implemented to a hand-held device having a navigation function such as a PDA (personal digital assistant), a cellular phone, or a laptop computer.

FIGS. 3A-3F show display examples of the navigation system under the present invention. In the example of FIGS. 3A-3F, it is assumed that the address of the destination is "19145 Gramercy Pl, Torrance". Since the address of the destination is represented by an odd number, in FIGS. 3B-3E, building footprints and house numbers are displayed only on the left side of the screens. Thus, when the address number is an even number, these images may be displayed on the right side of the screen. Further, without regard to whether an even or odd number, it is also possible that the navigation screen shows the building footprints and house numbers on both sides of the screen.

Figure 2A:
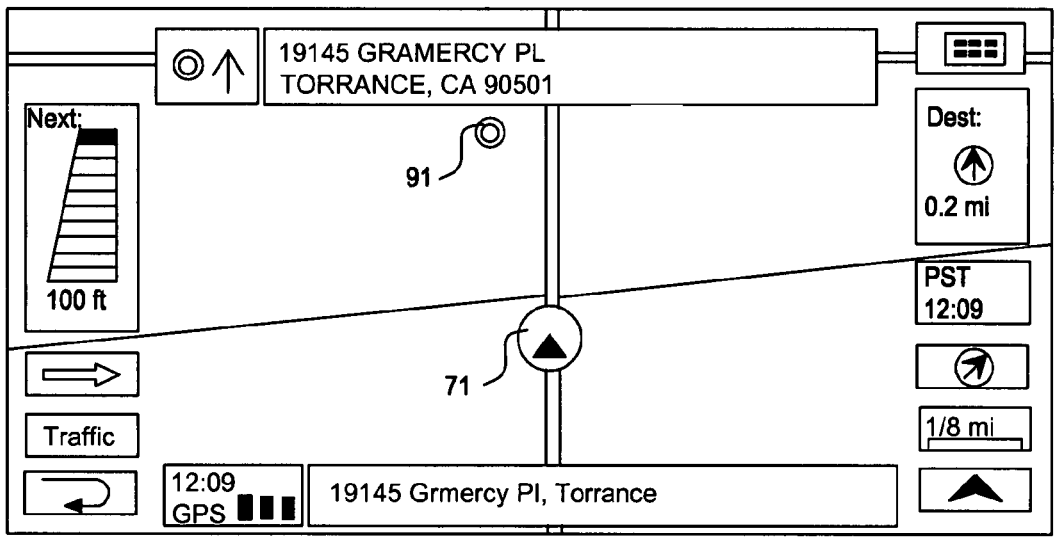
FIGS. 2A and 2B are schematic diagrams showing examples of screen display of a conventional navigation system, where
Figure 2B:
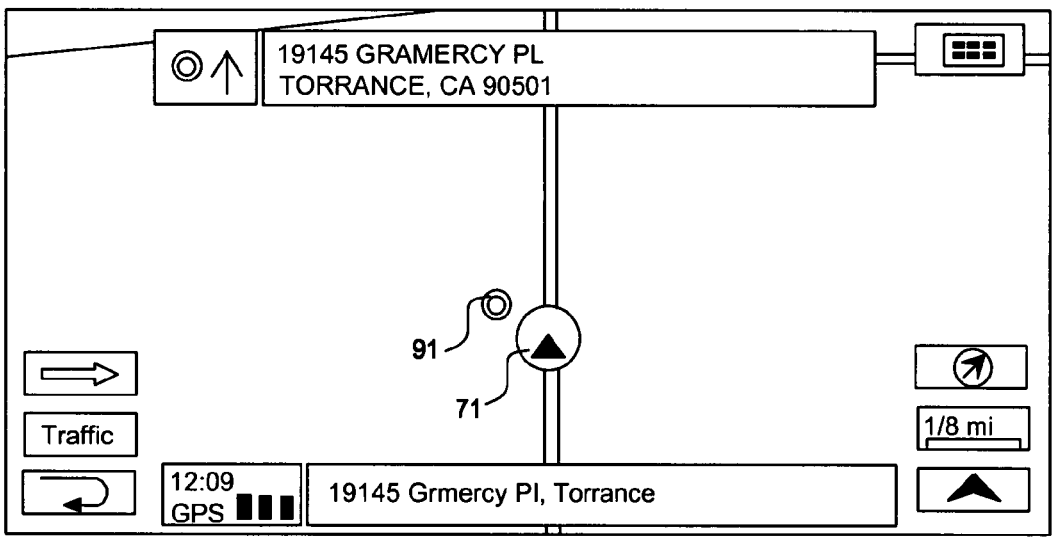
Figure 3A:
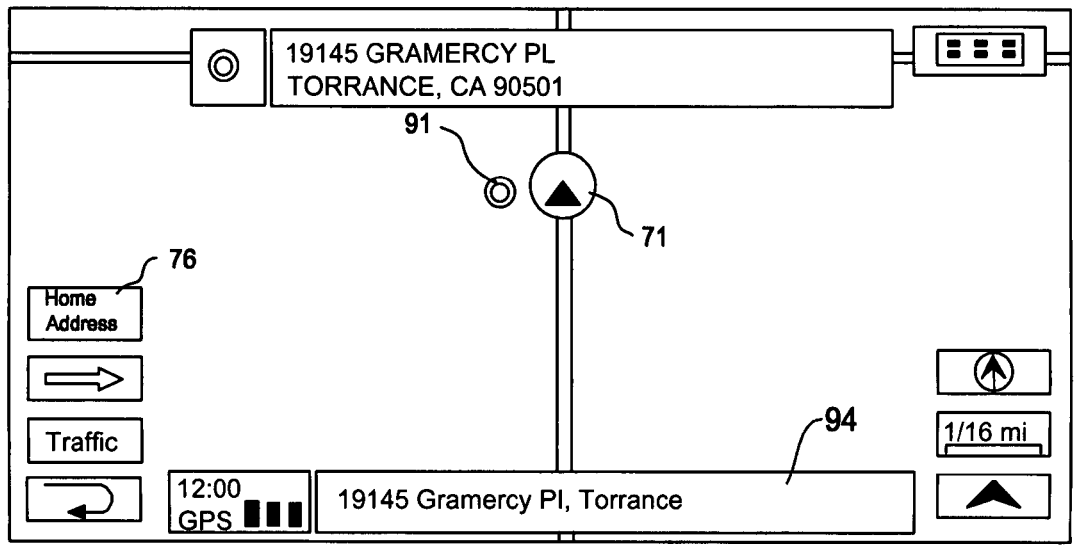
FIGS. 3A-3H are schematic diagrams showing display examples of arrival screen under the present invention where
Figure 3B:
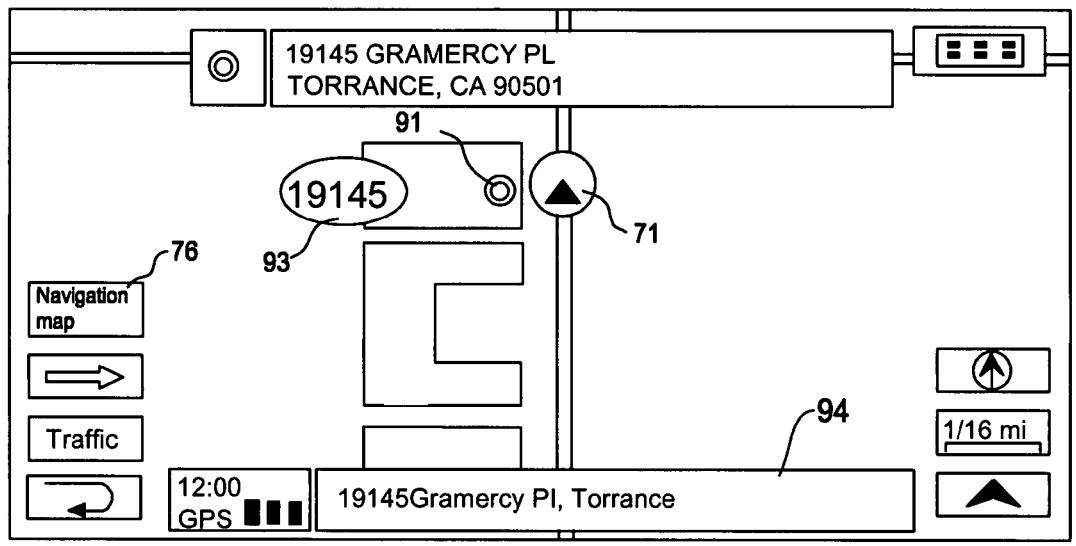

FIGS. 3A and 3B show a relationship between an ordinary route guidance screen (FIG. 3A) and a destination arrival screen (FIG. 3B) of the present invention. The screen of FIG. 3A shows only a destination indicator and a current position mark while the screen of FIG. 3B additionally shows building foot prints and a house number displayed over the building footprint. Preferably, the screens of FIGS. 3A and 3B can be automatically or manually switched with one another through a switch-over key 76.

Figure 3C:
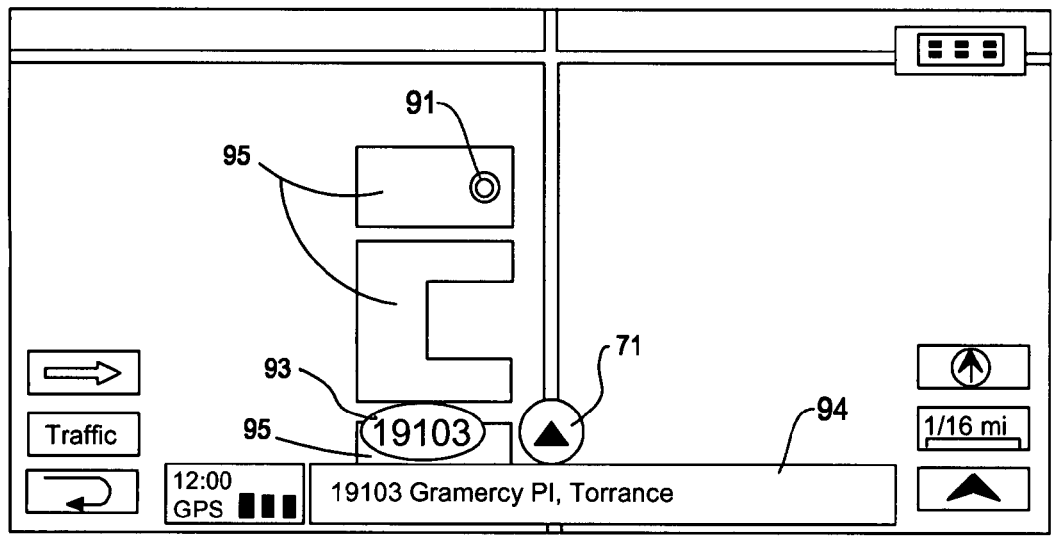
Figure 3D:
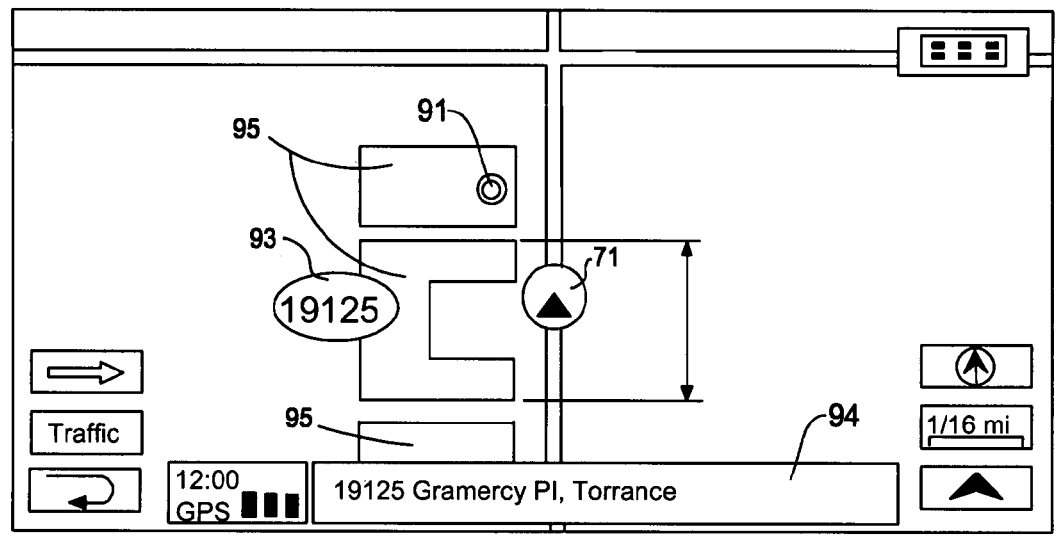
Figure 3E:
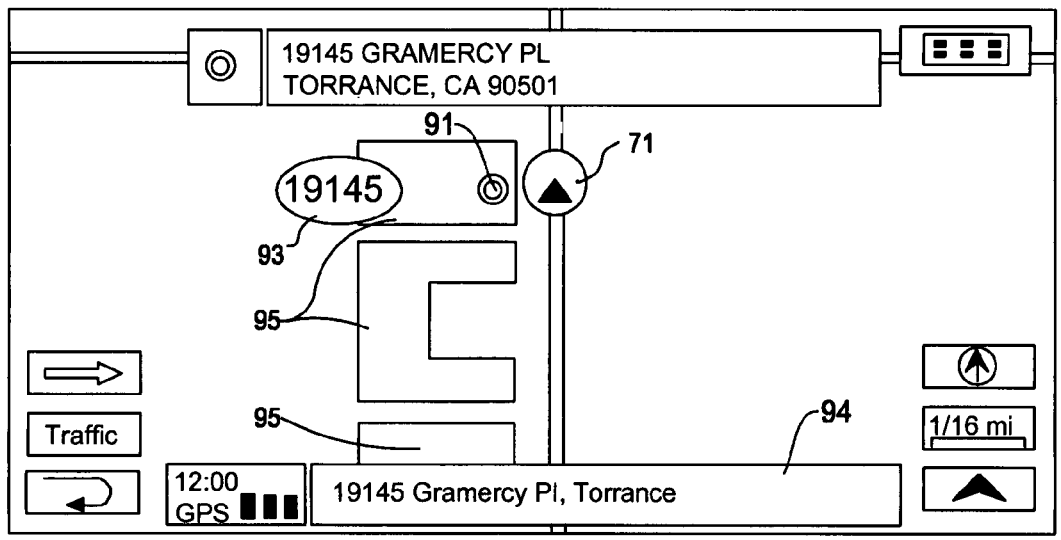
Figure 3F:
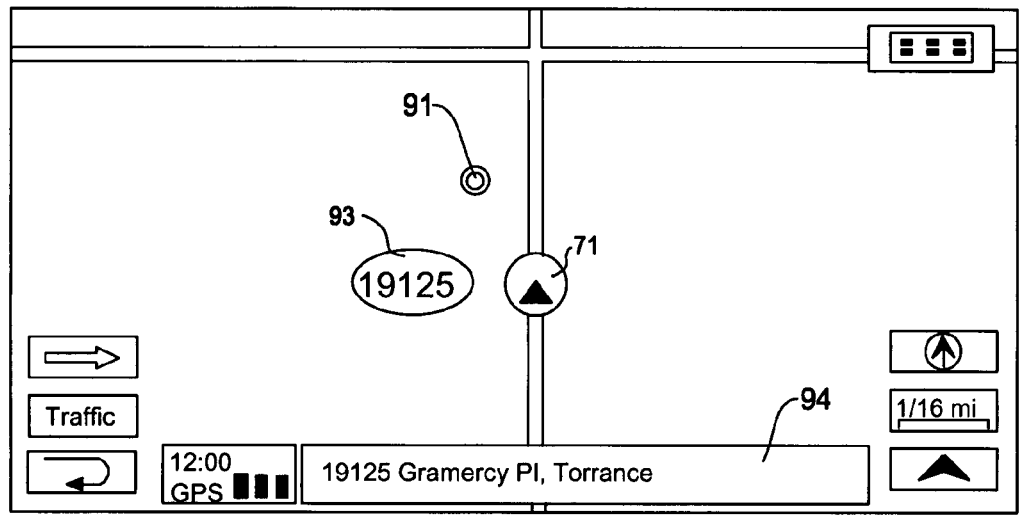

FIGS. 3C and 3D show the situation where a vehicle is advancing to the destination and the house number is changing depending on the change of the vehicle position. FIG. 3E shows the situation where the vehicle has fully arrived at the destination. FIG. 3F shows an example of the destination arrival screen when building footprint data is unavailable through the map data.

When a user selects a destination through the procedure such as shown in FIGS. 1A-1H, the navigation system shows a map image to indicate a calculated route and a relative location of the vehicle on the map image. As the vehicle approaches the destination and reaches within a predetermined distance from the destination, the navigation system automatically changes the map screen to a destination arrival screen with house numbers as shown in FIGS. 3B-3H. An example of the predetermined distance is, for example, 600-1,000 feet that can be adjusted by the user.

The destination arrival screen with house numbers shown in FIGS. 3B-3E give the user an image similar to address marks painted on a wall of the building or a curb of the road. The destination arrival screen of FIGS. 3B-3E include a current position indicator 71, the road on which the vehicle is running, a destination indicator 91, building footprints 95, and address (house number) indicators 93. Further, in this example, the current location of the vehicle is displayed in a location data box 94 at the bottom of the screen which changes in response to the change of the vehicle position.

The image of the destination arrival screen with the building footprints and house numbers may be calculated and rendered on the display by using the map data in the navigation system. For example, in the map data, each route is configured by a plurality of road segments each being defined by absolute locations at start point and end point. Based on such absolute locations or further interpolating the absolute locations, locations corresponding to house numbers can be determined. Further, typical map data include polygon data which shows a two-dimensional shape of a building, mountains, rivers, etc., the building footprints can be produced on the screen.

As the vehicle proceeds to the destination, the location of the destination and neighboring spots on the display will change accordingly. The address indicator 93 shows the street address number (house number) in response to the vehicle position on the road that the user is moving as illustrated in FIGS. 3C and 3D. The address indicator 93 including the house number or the street address is arranged to appear over the building footprints to indicate where the vehicle is passing by.

The current position indicator 71 shows the current position of the vehicle that is moving on the road. The location text box 94 shows the current position of the vehicle in a text form. In FIG. 3C, since the current position of the vehicle is "19103 Gramercy Pl, Torrance" as indicated in the text box 94, the house number "19103" is illustrated over the building footprint 95 that is closest to the current position. In FIG. 3D, since the vehicle has now advanced to the location "19125 Gramercy Pl, Torrance" as indicated in the text box 94, the house number "19125" is illustrated over the building footprint 95 that is closest to the current position.

FIG. 3E shows a destination arrival image in which the vehicle has now arrived at the destination "19145 Gramercy Pl, Torrance". The house number "19145" is illustrated over the building footprint 95 that is the destination. The navigation system may give a voice announcement indicating that the destination is reached. In the present invention, in response to the movement of the vehicle, the house number is conspicuously displayed over the corresponding building footprint, the user is able to know the arrival at the destination with higher accuracy.

The destination arrival screen of FIG. 3F shows a situation where the building footprint data is unavailable in the map data, thus, the house number indicator 93 without accompanying the building footprint is displayed. As described later, polygon data for producing the building footprints may not be contained in the map data for smaller buildings or houses. In FIG. 3F, the house number on the house number indicator 93 and the location of the house number indicator 93 change with the change of the current position indicator 71.

Figure 4:
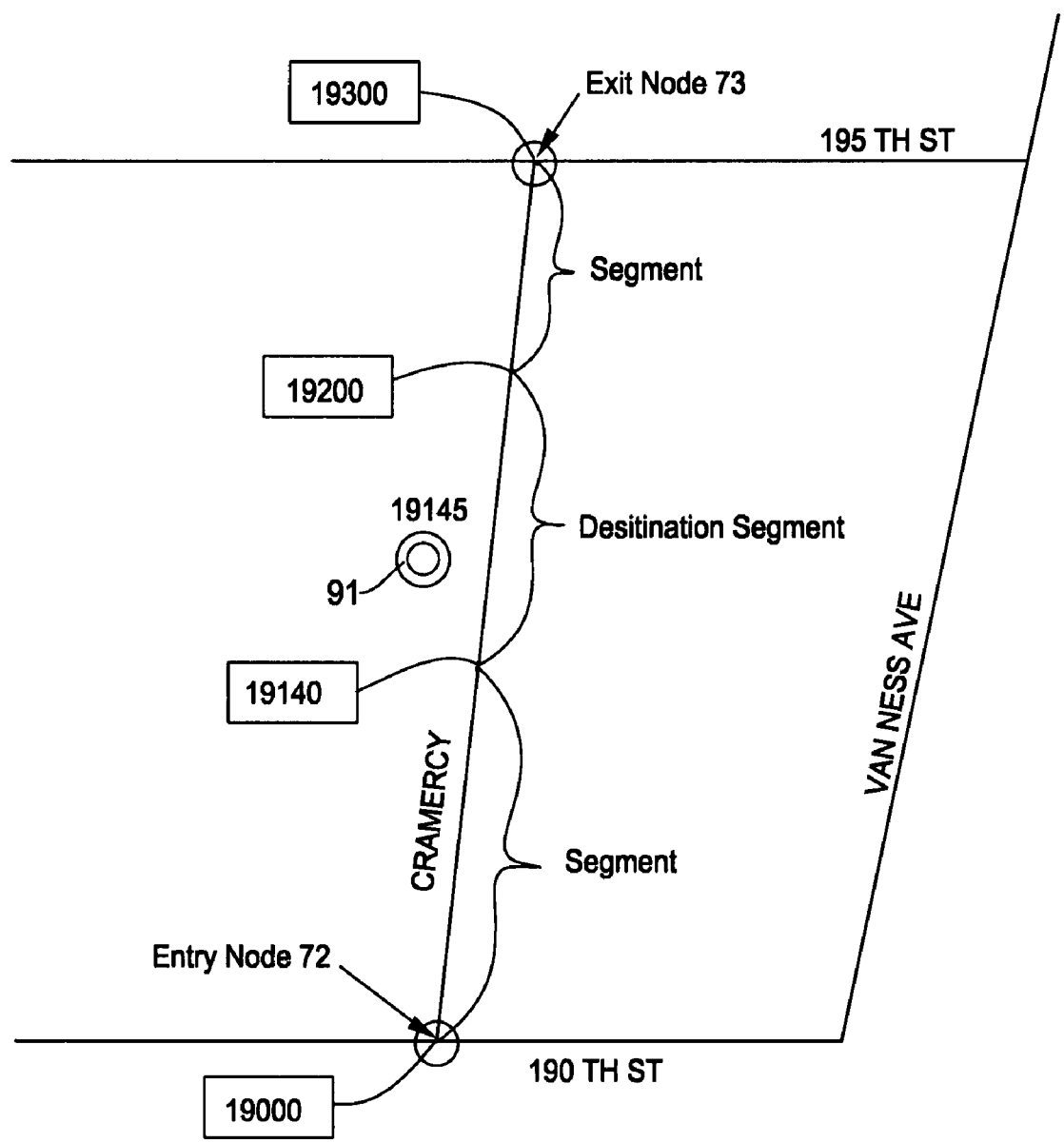
FIG. 4 is a schematic view showing the representation of roads, destination, road segments to describe the implementation of the destination arrival detection and display method under the present invention.

FIG. 4 is a schematic view showing the relationship between the destination and road segments and street address numbers to describe the implementation of the display method under the present invention. The map data storage in the navigation system stores the map information including a large number of road segments. A road segment is a segment that represents one unit of a road. Thus, one road may be subdivided into a plurality of road segments. Each road segment has a start point address number and an end point address number. An absolute location of each of the start point and end point is represented by latitude and longitude data (position data or node data).

Typically, other than two points of the road segment noted above, the map data in the navigation system do not have information as to exact position of addresses located on the road segment. In other words, the map data include a street address number and an absolute location of each of the start and end points of the road segment but do not have the street address numbers and absolute locations on the intermediate of the road segment. However, by interpolating or dividing the length between start point address and the end point address, more precise locations on the road segment can be obtained.

As noted above, in a navigation system, a road is configured by connection of a plurality of road segments. Thus, in the example of FIG. 4, a road "GRAMERCY" is configured by three road segments where an entry node 72 is established at one end and an exit node 73 is established at another end. In this example, it is assumed that the street address number "191451" is the address of the destination which is indicated by the destination indicator 91.

As noted above, the navigation system does not necessarily have information on all positions corresponding to all addresses along the road. In the example of FIG. 4, only the locations for the addresses at each start and end point of a road segment are known with a high degree of preciseness. That is, the locations of the addresses for the street address numbers 19300, 19200, 19140, and 19000 on the road "GRAMERCY" are known. The locations for addresses that are between the known street address numbers such as a street address number "191451" must be calculated to determine an approximate (estimated) location thereof.

Thus, for displaying the street address numbers and position indicators in FIGS. 3C-3E, the navigation system interpolates the position of a certain street address number by dividing the road segment between the two end points of the road segment. For example, in FIG. 4, the location of the street address number "19145l" is determined by dividing the road segment that starts with the street address number "19140" and ends with the street address number "19200" in proportion to the numerical value of the street address number "19145".

Referring back to the example of FIGS. 3C-3E, the destination arrival screen of FIGS. 3C and 3D show the situation where the vehicle is close to the destination and FIG. 3E shows the situation where the vehicle has arrived at the destination. In the example of FIGS. 3C-3E, the navigation system displays the destination arrival screen which includes the destination associated with building footprint data and a house number over the building footprint. As noted above, the location on the road expressed by the house number can be obtained by interpolating the address numbers between the start point and the end point of the road segment.

It is also possible to improve the accuracy of the location corresponding to the address number by interpolating the footprint data. Generally, the recent map data include footprint data (also referred to as "polygon data" noted above) showing a topological shape of a structure such as a building, house, natural object, etc. The footprint data define the topological (two-dimensional) shape of such a structure by absolute positions of corner points of the structure by latitude and longitude values. Since the building footprint data include accurate position information, it is expected that the building footprint data help in estimating an accurate location of a destination by incorporating the position information.

Therefore, the destination arrival screen of FIGS. 3C-3E show a current vehicle position indicator 71, the road on which the user's vehicle is running, a destination indicator 91, topological shape (building footprints) 95 produced based on the polygon data, and the address indicators 93 over the building footprint 95. In this example, the destination is represented by the building footprint 95, which will be described later in detail with reference to FIG. 5A, in addition to the destination indicator 91 and the street address number on the house number indicator 93.

As the vehicle comes closer to the destination, the navigation system will change the display to reflect the change of the vehicle position on the destination arrival screen having the house numbers and building footprints. As illustrated in FIG. 3D, the address indicator 93 is arranged to display the street address number (house number) as long as the vehicle position stays within the same building area. Therefore, the driver of the vehicle can easily identify the address of the building when driving in the vicinity of the building by comparing the actual outside view and the view on the navigation screen.

Figure 3G:
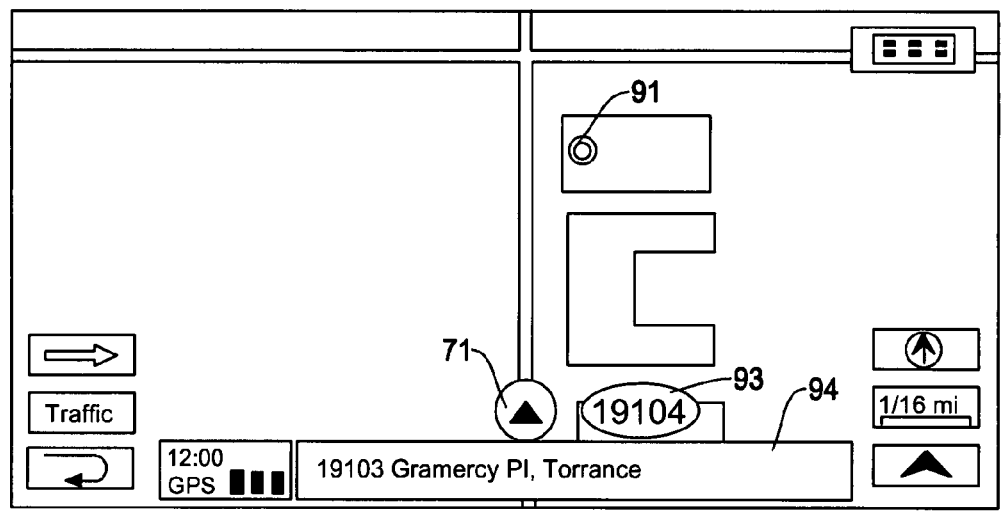
Figure 3H:
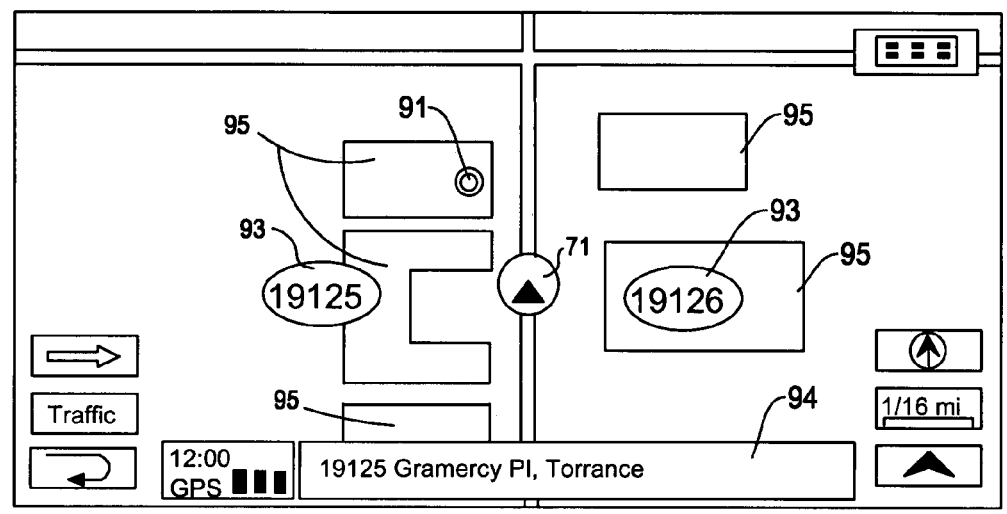

FIG. 3G shows the situation where house number indicator and the building footprints are on the right side of the screen. Typically, this situation arises when the house number of the destination address is an even number. Further, without regard to whether an even or odd number, it is also possible that the navigation screen shows the building footprints and house numbers on both sides of the screen as shown in FIG. 3H.

As noted above, the footprint data in the map data storage include information on the absolute locations and shape of the structure. Thus, in the case where the destination is associated with such a structure, the navigation system can estimate the location of the destination more accurately. In other words, not only the footprint image on the screen provides an intuitive understanding to the user on the location, it also plays a role of improving the accuracy in determining the location.

Figure 5A:
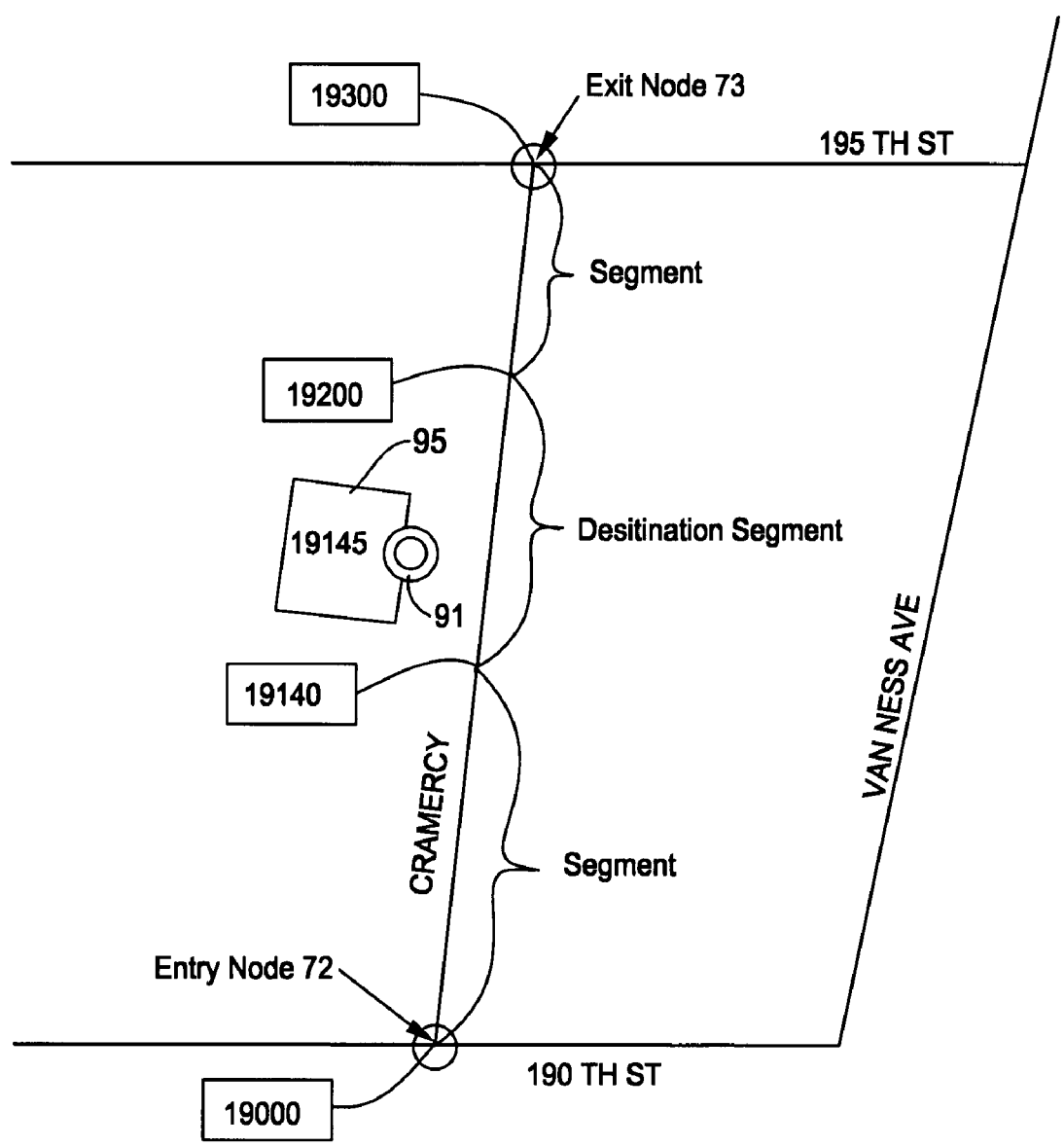
FIGS. 5A and 5B are schematic views showing the representation of roads, destination, road segments to describe the implementation of the present invention which includes footprint data along the road in the neighborhood of the destination.
Figure 5B:
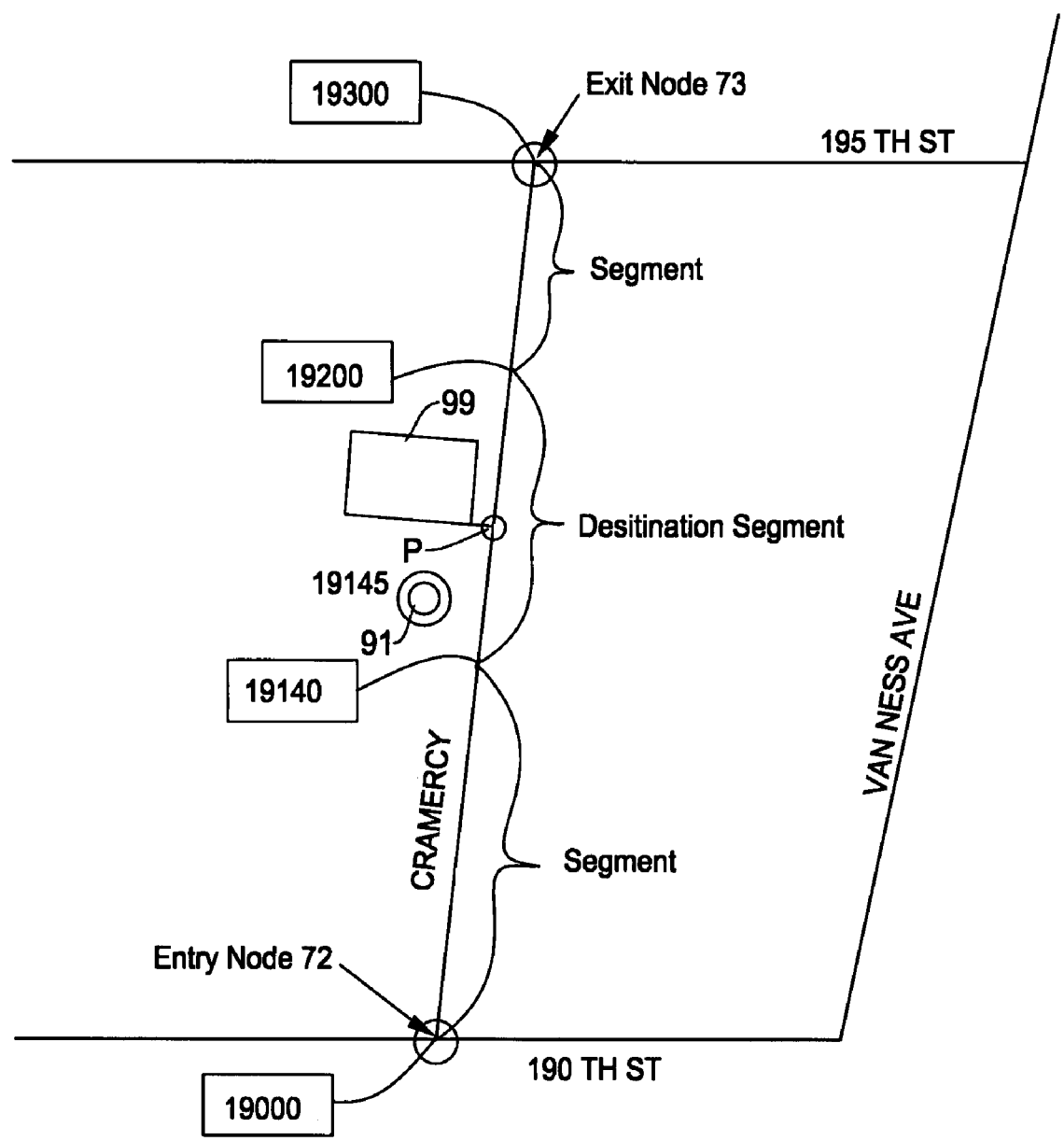

FIGS. 5A and 5B are schematic views showing the relationship among the destination, road segments, building footprint, and street address numbers to describe the implementation of the display method under the present invention. The example of FIGS. 5A and 5B is in the situation corresponding to the example of FIGS. 3C-3E where the address of the destination is "19145 Gramercy P1, Torrance". In this case, the house number "19145" indicates the address of the building 95, which is a destination.

Thus, in the example of FIG. 5A, a topological shape of the building 95 at the destination "19145 Gramercy P1, Torrance" is illustrated based on the footprint (polygon) data. In the footprint data, at least each corner point of the building footprint is given by an absolute position expressed by latitude and longitude values. Thus, such corner positions can be used to correlate with the positions of the end of the road segment on which the destination is located to accurately assign the locations on the road segment.

Thus, in the example shown in FIG. 5A, not only the locations for the addresses at the ends of road segments, but also the topological shape of the building 95 is included to correlate with the locations on the road segments. That is, the locations of the addresses for the street address numbers 19300, 19200, 19140, 19000 as well as the location of the footprint having the address of 19145 are known. Since the destination is also expressed by the building footprint, the user can easily determine the actual arrival of the destination by comparing the destination arrival screen with the house numbers on the screen of the navigation system and an actual view outside of the vehicle.

FIG. 5B shows another situation where there exists building footprint data adjacent to the address of the destination. In this example, it is assumed that the map data include footprint data of a building 99 on the road (destination) segment with the street address number "19160" at the point P on the road "Gramercy". Because the street address number of the building 99 at the point P is "19160", the navigation system determines that the position on the road segment corresponding to the lower end (marked by point P) of the building 99 has the address number "19160".

Thus, the locations of the street address number "19145" of the destination and neighboring addresses are determined by interpolating between the absolute positions of the address numbers "19160" and "19140". Typically, such interpolation can be conducted by equally dividing the distance between the address numbers "19160" and "19140". As a result, the locations of the destination and the neighboring addresses can be displayed on the destination arrival screen of FIGS. 3C-3E with high accuracy.

Figure 6A:
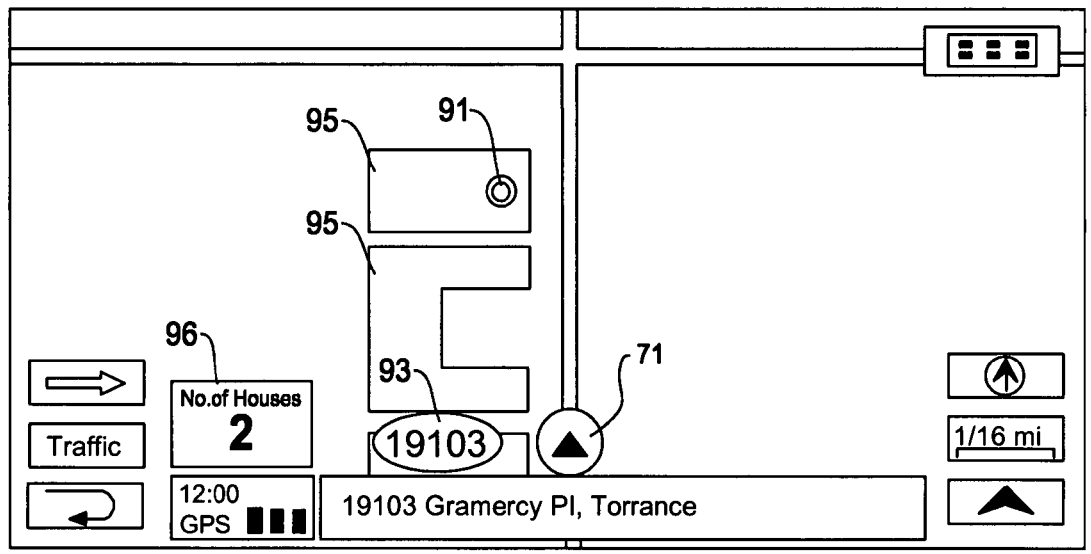
FIGS. 6A-6C are schematic diagrams showing further examples of destination arrival screen under the present invention, which include a count down number for counting a number of buildings located between the current position and the position of the destination and a position mark showing the position of the destination.
Figure 6B:
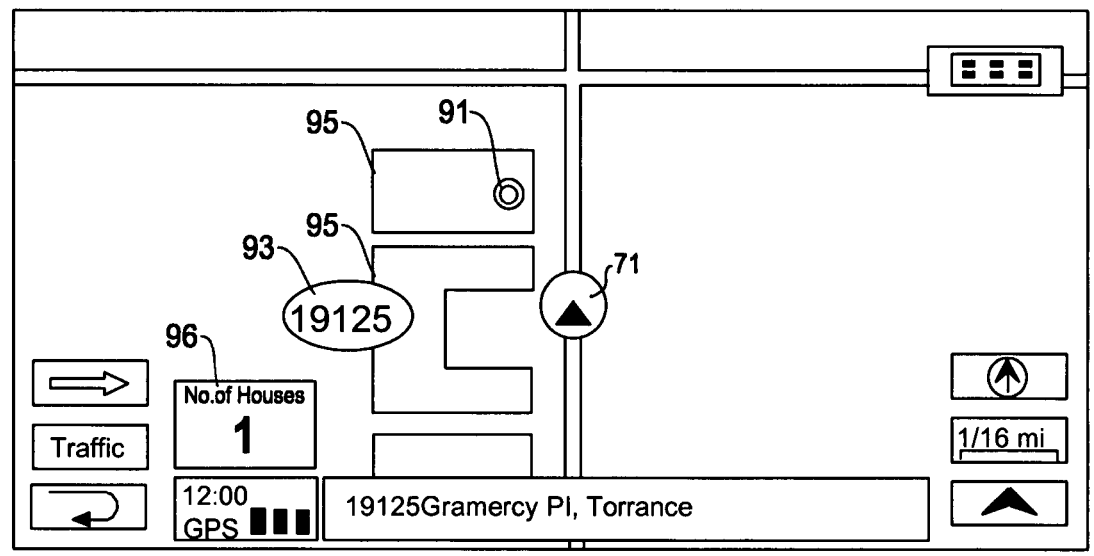
Figure 6C:
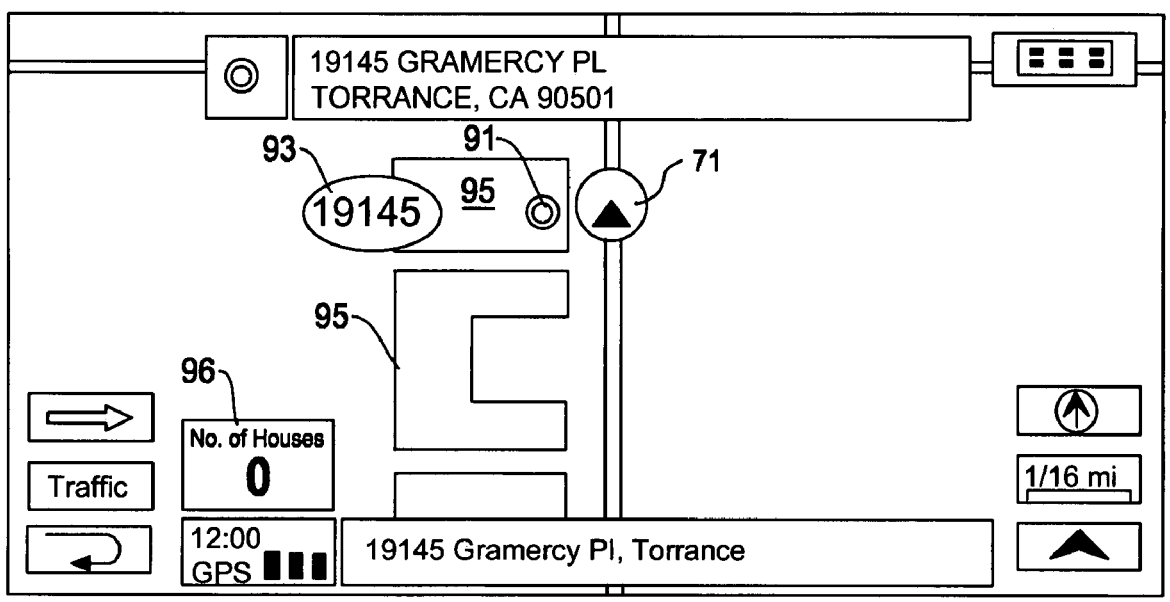

FIGS. 6A-6C show another example of destination arrival screen of the present invention where the destination arrival screen includes house numbers, building footprints, and a count down number of houses. In the example of FIG. 6A, the current position address is "19103" and there exists two remaining buildings houses between the current position address and the destination address. Accordingly, in this case, a count down number indicator 96 displays a count down number "2", indicating that when the navigation system counts two more, the destination will be reached.

As the vehicle moves, as shown in FIG. 6B, the current position address has changed to "19125" and the count down number displayed in the count down number indicator has been changed from 2 to 1. This means that there is only one house to pass until reaching the final destination. Thus, when the vehicle has arrived at the destination, the current position address changed to "19145" which is the destination address and the count down number becomes "0" to show that the vehicle has arrived at the destination as shown in FIG. 6C. Although the arrival screen in the above example counts down in the manner of "two", "one", "zero", any other way of counting down the number can be used within the context of the present invention.

As described above, since the recent map data tend to include footprint data, the number of buildings or houses located between the current street address and the destination address can be obtained from the map data. This is done, for example, by counting the footprints between current street address and the destination address if the footprint data are included in the road segment related to the destination. When there is no footprint (polygon) data relating to the area of the destination, the house number indicator 93 may be displayed along with the current position indicator 71 without displaying building footprints as shown in the example of FIG. 3F.

Figure 7:
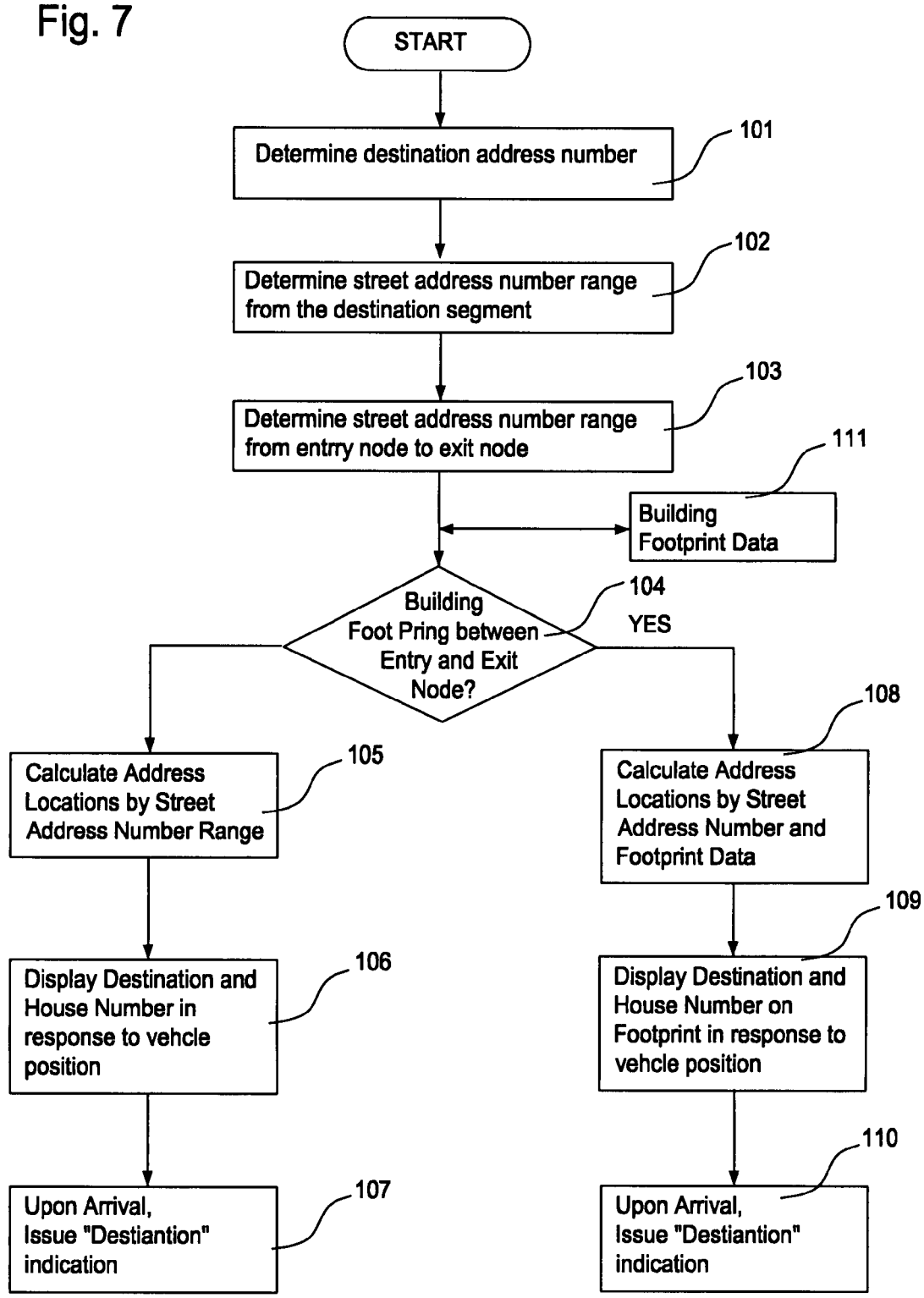
FIG. 7 is a flow chart showing an example of operation of the present invention for estimating the location of the destination and neighboring addresses along the road and displaying those locations and the street address numbers on the destination arrival screen.

An example of operational steps for conducting the present invention is described with reference to the flow chart of FIG. 7. As described above, the present invention estimates the location of the destination and neighboring addresses along the road and displays the street address numbers of those locations on a destination arrival screen. As the user selects a destination and the navigation system determines the route to the destination as described with reference to FIGS. 1A to 1H, the navigation system starts the operation of estimating the location of the destination and neighboring addresses.

In step 101, the navigation system determines the street address (house) number of the destination. In the case described with reference to FIGS. 3C-3E and 4, the street address number of the destination is "19145". The navigation system then determines a range of street address number of the road segment (destination segment) that should have the street address number "19145" in step 102. In the example of FIGS. 3C-3E and 4, the road segment having the street address number range between "19140" and "19200" on the road "Gramercy" is the destination segment.

In step 103, the navigation system determines the street address number range from the entry node and the exit node of the road "Gramercy". In the above example, the street address number ranges from "19000" at the entry node to "19300" at the exit node as shown in FIG. 4. Next, at step 104, the navigation system checks the map data file 111 whether footprint data exists between the entry and exist nodes of the road "Gramercy".

As noted above with reference to FIGS. 3C-3E and 4, the recent map data include footprint data (polygon data) of relatively large structures or natural objects that express the topological shape thereof. Thus, when the destination is specified, the navigation system checks the map data file 111 as to whether there is any polygon (footprint) data associated with the street segment. Namely, the navigation system checks whether there is any structure accompanied by footprint data defined by latitude and longitude data.

If no footprint data exists between the entry node and exist node, at step 105, the navigation system calculates the locations of the destination and neighboring addresses by interpolating the street address numbers on the road segment between the two end points. In the example of FIGS. 3C-3E and 4, the street address number "19145" is located on the road (destination) segment between the address range from "19140" to "19200". Thus, the navigation system proportionally divides the locations on the road segment between the street address numbers "19140" to "19200" by the difference which, in this case, is "60". Then, the location corresponding to the difference "5" between the street address number "191401" and the street address number "191451" is allocated on the road segment.

Then, in step 106, the navigation system displays the destination arrival screen showing the destination and the house number indicator 93 on the screen without showing building footprints (FIG. 3F). The reading of the house number indicator 93 on the destination arrival screen changes in response to the change of the current vehicle position 71. When the vehicle comes sufficiently close to the destination on the destination arrival screen, the navigation system announces the arrival at the destination at step 107.

In the above noted step 104, if it is determined that the building footprint data exists between the exit node and the entry node, the process moves to a step 108 where the navigation system calculates more accurate positions of the street address numbers on the road segment. This procedure is done by combining the absolute locations of the points on the building footprint with the absolute locations of the start or end point of the road segment and interpolating between the two adjacent absolute locations. Thus, the navigation system is able to accurately determine the locations of the street address numbers of the destination and neighboring addresses.

After the calculation, in step 109, the navigation system displays the destination address on the destination arrival screen as shown in FIGS. 3C-3E and 6A-6C when the vehicle comes within a predetermined distance range from the destination. As shown in FIGS. 3C and 6A, the current position indicator 71, the street address number of the destination indicator 91, the address number indicator 93, and the building footprint 95 are displayed on the destination arrival screen. Then, the vehicle comes sufficiently close to the destination on the destination arrival screen as shown in FIGS. 3E and 6C, the navigation system announces the arrival at the destination. As described above, it is also possible to display the destination arrival screens including the count down number as illustrated in FIGS. 6A-6C. In addition to the display, the navigation system can also produce the voice announcement of the count down number.

Figure 8:
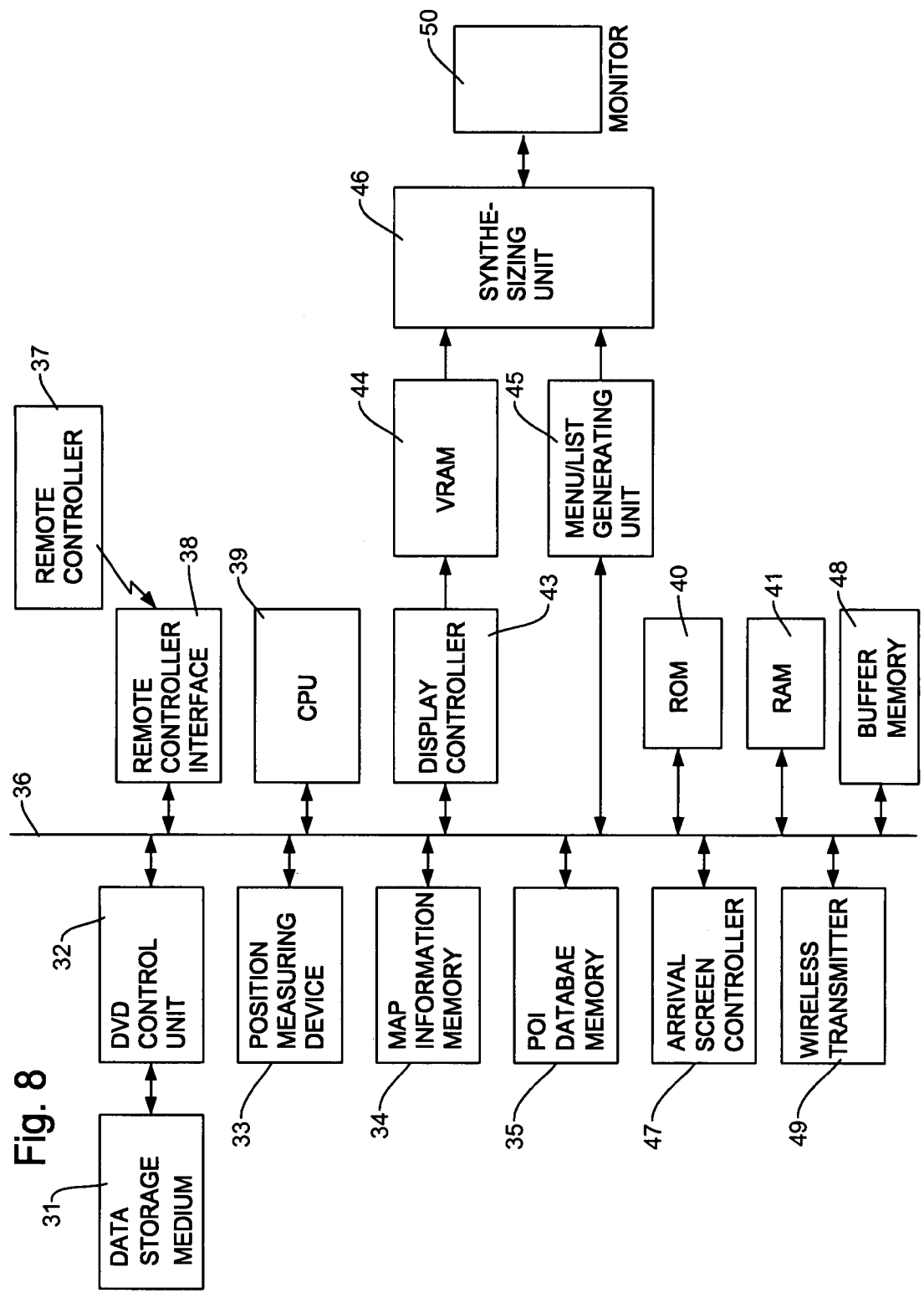
FIG. 8 is a block diagram showing an example of configuration of a vehicle navigation system implementing the destination arrival screen of the present invention.

FIG. 8 shows an example of structure of a vehicle navigation system for implementing the present invention. While the vehicle navigation system is explained for an illustration purpose, the present invention can also be applied to other types of navigation system, such as a portable navigation device implemented by a PDA (personal digital assistant) device, other hand-held devices such as a wireless telephone, or a laptop or notebook computer.

In the block diagram, the navigation system includes a data storage medium 31 such as a hard disc, CD-ROM, DVD or other storage means for storing the map data. The navigation system includes a control unit 32 for controlling an operation for reading the information from the data storage medium 31, and a position measuring device 33 for measuring the present vehicle position or user position. For example, the position measuring device 33 has a vehicle speed sensor for detecting a moving distance, a gyroscope for detecting a moving direction, a microprocessor for calculating a position, a GPS (global positioning system) receiver for receiving signals from GPS satellites, and etc.

The block diagram of FIG. 8 further includes a map information memory 34 for storing the map information which is read from the data storage medium 31, a database memory 35 for storing database information such as point of interest (POI) information which is read out from the data storage medium 31, a remote controller 37 for executing a menu selection operation, an enlarge/reduce operation, a destination input operation, etc. and a remote controller interface 38. Although a remote controller is a typical example for selecting menus, executing selected functions and etc., the navigation system includes various other input methods to achieve the same and similar operations done through the remote controller.

In FIG. 8, the navigation system further includes a bus 36 for interfacing the above units in the system, a processor (CPU) 39 for controlling an overall operation of the navigation system, a ROM 40 for storing various control programs such as a route search program and a map matching program necessary for navigation control, a RAM 41 for storing a processing result such as a guide route, a display controller 43 for generating map image (a map guide image or an arrow guide image) on the basis of the map information, a VRAM 44 for storing images generated by the display controller 43, a menu/list generating unit 45 for generating menu image/various list images, a synthesizing unit 46, a destination arrival screen controller 47, a wireless transmitter 49 for wireless communication to retrieve data such as traffic incident data from a remote server, a buffer memory 48 for temporally storing data for ease of data processing, and a monitor (display) 50.

The destination arrival screen controller 47 controls the operation to display the destination arrival screen such as shown in FIGS. 3C-3H and 6A-6C. The destination arrival screen controller 47 can be a CPU 39 noted above or a separate processor. The destination arrival screen controller 47 performs a function of the present invention for establishing the relationship among the street address numbers on the road segment and the actual positions of the destination and neighboring addresses and displaying the relationship with on destination arrival screen.

The destination arrival screen controller 47 reads out map data from the map information memory 34 to compute the position of the destination. By learning the actual locations of the destination and the neighboring addresses, the navigation system records the updated address data in the buffer memory 49. Thus, the navigation method and system is able to more accurately determine the positions of the destination and neighboring addresses so that it can accurately display the positional relationship including the street (house) address, building footprints, and the count down number of the buildings which are located between the current position address and the destination address on the destination arrival screen.

As has been described above, according to the present invention, the navigation system allows the user to more easily estimate the distance to the destination by displaying the street address number on the top of the building footprint where the user is passing by, a position of the destination, a current position of the user, a road on which the user is moving, and street address numbers of the destination address. Since the street address of the building footprint where the user is passing by can be directly compared with the street address of the destination, the user is able to more easily estimate the distance from the current position to the destination when the user enters into the area that is less than a predetermined distance from the destination.

Further, the destination arrival screen further includes a count down number for counting a number of buildings located between the current position and the position of the destination and a position mark showing the position of the destination. By counting down the simple number on the screen as well as by voice announcement, the user can easily arrive at the destination with higher accuracy.

Although the invention is described herein with reference to the preferred embodiment, one skilled in the art will readily appreciate that various modifications and variations may be made without departing from the spirit and scope of the present invention. Such modifications and variations are considered to be within the purview and scope of the appended claims and their equivalents.

What is claimed is:

1. A method for displaying an arrival screen for a navigation system, comprising the following steps of:
   receiving a street address number of a destination specified by a user;
   retrieving map data indicating a road segment which includes the specified street address number thereon from a map information storage;
   estimating a position of the destination based on the street address number of the destination and position data of the road segment;
   detecting whether the user comes within a predetermined distance range from the destination; and
   displaying a destination arrival screen when the user comes within the predetermined distance range from the destination where the destination arrival screen includes a destination indicator which shows a location of the destination and a current position indicator which shows a current location of the user; and
   displaying a house number indicator which indicates a house number at a location corresponding to the current location of the user on the destination arrival screen where the house number indicator is displayed over a building footprint when building footprint data is available in the map data;
   wherein the house number indicator changes its position and the house number to that corresponding to the current location in real time in response to changes of the current position of the user.

2. A method for displaying an arrival screen as defined in claim 1, wherein the destination arrival screen includes a location data box in which a street address number in a text form changes in response to the change of the current position of the user.

3. A method for displaying an arrival screen as defined in claim 1, wherein the destination arrival screen further includes a count down number indicator for indicating in real time a changing number of buildings located between the current position of the user and the position of the destination.

4. A method for displaying an arrival screen as defined in claim 1, further comprising the steps of:
   checking whether any footprint data exist in the map data adjacent to the road segment which includes the specified street address of the destination; and
   estimating the position of the destination address by incorporating position information included in the footprint data;
   wherein the footprint data of a building includes the position information which is expressed by latitude and longitude data indicating a shape, size and location of the building.

5. A method for displaying an arrival screen as defined in claim 4, wherein the step of estimating the the position of the destination by incorporating the position information included in the footprint data of the building includes a step of interpolating between a street address number on the road segment and a selected point on the road segment corresponding to the latitude and longitude data of the building.

6. A method for displaying an arrival screen as defined in claim 1, wherein the building footprint is a two-dimensional image showing a topological shape of the building derived from the map data.

7. A method for displaying an arrival screen as defined in claim 3, wherein the street address number is provided on one side of the road on which the user is moving where the destination is located on the one side.

8. A method for displaying an arrival screen as defined in claim 3, wherein the street address number is provided on both sides of the road on which the user is moving without regard to which side of the road the destination is located.

9. A method for displaying an arrival screen as defined in claim 1, further comprising the step of switching between a screen, which does not include the street address and the destination arrival screen at any desired time by operating a switch-over key.

10. A method for displaying an arrival screen as defined in claim 3, wherein the destination arrival screen further includes an image of an intersection when the intersection is located close to the destination.

11. An apparatus for displaying an arrival screen for a navigation system, comprising:
- an input device for transmitting a street address number of a destination specified by a user to the navigation system;
- a processor for executing a program to retrieve map data indicating a road segment which includes the specified street address number thereon from a map information storage;
- the processor estimates a position of the destination based on the street address number of the destination and position data of the road segment;
- a position measuring device for detecting a current position of the user as to whether the user comes within a predetermined distance range from the destination; and
- a display for displaying a destination arrival screen when the user comes within the predetermined distance range from the destination where the destination arrival screen includes a destination indicator which shows a location of the destination and a current position indicator which shows a current location of the user; and
- a house number indicator for indicating a house number at a location corresponding to the current location of the user on the destination arrival screen where the house number indicator is displayed over a building footprint when building footprint data is available in the map data;
- wherein the house number indicator changes its position and the house number to that corresponding to the current location in real time in response to changes of the current position of the user.

12. An apparatus for displaying an arrival screen as defined in claim 11, wherein the destination arrival screen includes a location data box in which a street address number in a text form changes in response to the change of the current position of the user.

13. An apparatus for displaying an arrival screen as defined in claim 11, wherein the destination arrival screen further includes a count down number indicator for indicating in real time a changing number of buildings located between the current position of the user and the position of the destination.

14. An apparatus for displaying an arrival screen as defined in claim 11,
- wherein the processor checks whether any footprint data exist in the map data adjacent to the road segment which includes the specified street address of the destination;
- wherein the processor estimates the position of the destination address by incorporating position information included in the footprint data; and
- wherein the footprint data of a building includes the position information which is expressed by latitude and longitude data indicating a shape, size and location of the building.

15. An apparatus for displaying an arrival screen as defined in claim 14, wherein, when the processor estimates the position of the destination by incorporating the position information included in the footprint data of the building, the processor further interpolates between a street address number on the road segment and a selected point on the road segment corresponding to the latitude and longitude data of the building.

16. An apparatus for displaying an arrival screen as defined in claim 11, wherein the building footprint is a two-dimensional image showing a topological shape of the building derived from the map data.

17. An apparatus for displaying an arrival screen as defined in claim 13, wherein the street address number is provided on one side of the road on which the user is moving where the destination is located on the one side.

18. An apparatus for displaying an arrival screen as defined in claim 13, wherein the street address number is provided on both sides of the road on which the user is moving without regard to which side of the road the destination is located.

19. An apparatus for displaying an arrival screen as defined in claim 11, wherein the processor controls the display to switch between a screen, which does not include the street address and the destination arrival screen at any desired time in response to operation of a switch-over key.

20. An apparatus for displaying an arrival screen as defined in claim 13, wherein the destination arrival screen further includes an image of an intersection when the intersection is located close to the destination.

* * * * *